United States Patent
Kumar et al.

(10) Patent No.: US 11,443,113 B2
(45) Date of Patent: *Sep. 13, 2022

(54) SOURCING OBJECT CREATION FROM NATURAL LANGUAGE INPUTS

(71) Applicant: SAP SE, Walldorf (DE)

(72) Inventors: Nishant Kumar, Singapore (SG); Panish Ramakrishna, Bangalore (IN); Kumaraswamy Gowda, Bangalore (IN); Rajendra Vuppala, Dublin, CA (US); Vidhya Neelakantan, Bangalore (IN); Erica Vandenhoek, Palo Alto, CA (US); Nithya Rajagopalan, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,521

(22) Filed: Mar. 19, 2021

(65) Prior Publication Data

US 2021/0209300 A1  Jul. 8, 2021

Related U.S. Application Data

(63) Continuation of application No. 16/656,255, filed on Oct. 17, 2019, now Pat. No. 10,963,636.

(51) Int. Cl.
| | |
|---|---|
| *G06F 40/205* | (2020.01) |
| *G06N 20/00* | (2019.01) |
| *G06F 3/0481* | (2022.01) |
| *G06N 5/04* | (2006.01) |
| *G06F 40/174* | (2020.01) |
| *G06F 40/186* | (2020.01) |

(52) U.S. Cl.
CPC .......... *G06F 40/205* (2020.01); *G06F 3/0481* (2013.01); *G06F 40/174* (2020.01); *G06N 5/04* (2013.01); *G06N 20/00* (2019.01); *G06F 40/186* (2020.01)

(58) Field of Classification Search
CPC ...... G06N 20/00; G06F 40/205; G06F 40/174
See application file for complete search history.

(56) References Cited

U.S. PATENT DOCUMENTS

| | | | | |
|---|---|---|---|---|
| 2006/0235690 | A1* | 10/2006 | Tomasic | G06F 3/0481 704/200 |
| 2006/0235691 | A1* | 10/2006 | Tomasic | G06F 16/243 704/232 |
| 2011/0314006 | A1* | 12/2011 | Sweeney | G06F 16/24578 707/723 |
| 2019/0236130 | A1* | 8/2019 | Li | G10L 15/22 |
| 2020/0043087 | A1* | 2/2020 | Burris | G06N 3/0454 |

* cited by examiner

*Primary Examiner* — Asher D Kells
(74) *Attorney, Agent, or Firm* — Klarquist Sparkman, LLP

(57) ABSTRACT

User-generated input is received that includes a sequence of words associated with initiation of a computer-implemented event. Thereafter, such input is parsed using at least one natural language processing (NLP) model. This parsed input is then used by a machine learning model to determine a suggested template having a plurality of fields for initiating the event. The template can then be presented in a graphical user interface. Related apparatus, systems, techniques and articles are also described.

20 Claims, 5 Drawing Sheets

FIG. 3

Create Sourcing Project

To create a Sourcing Project, specify the fields below. Templates used for constructing your Sourcing Project appear in the section at the bottom of the page, and available Templates may change depending on the project attributes you enter.

| | | | |
|---|---|---|---|
| Name: * | 10% Ethanol | Owner: | Customer Support Admin ⓘ |
| Description: | [Translations ⓘ] | Currency: | Indian Rupee |
| | [Translations ⓘ] | Commodity: | Additives 1216  Add more |
| Copy from Project: | (no value) | | |
| Project: | ○ Full Project  ● Quick Project ⓘ | | |
| Event Type: * | RFI ⓘ | | |
| Test Project: * | ○ Yes  ● No ⓘ | | |
| Base Language: | English | | |
| Origin: | Ariba Sourcing ⓘ | | |
| Regions: | EMEA Europe  Add more | | |
| Departments: | 400 Sales  Add more | | |
| Predecessor Project: | (no value) ⓘ | | |

[Create]  [Cancel]

Select a template
Select the template you want to use, and answer any questions related to it to create your project. How you set the fields in the section above might affect which templates are available.

● Request for Information
*Use an RFI to send questions to suppliers, gather supplier feedback, and qualify suppliers based on their responses. Buyers can weigh and grade supplier responses, and create an overall score for each supplier. Supplier responses are not revealed to other suppliers.*

SOURCING OBJECT CREATION FROM NATURAL LANGUAGE INPUTS

CROSS-REFERENCE TO RELATED APPLICATION

This application is a continuation of U.S. patent application Ser. No. 16/656,255, filed on Oct. 17, 2019, which is hereby incorporated by reference.

TECHNICAL FIELD

The subject matter described herein relates to the auto population of forms, such as for sourcing objects, using a combination of natural language and machine learning processing.

BACKGROUND

Conventional techniques for creating various computer-based events, such as sourcing products as part of a larger supply chain require a user to manually enter relevant information. Such a process can be lengthy and, additionally, prone to error. For example, to create a sourcing object event, a user inputs data into fixed data entry fields through a user interface (UI). As part of this process, the user needs to identify and select an appropriate template for the event of interest. The user then needs to manually populate various line items in the template (which can range to a few items to several thousand). In some cases, some or all of the fields can be populated using a previously created file (e.g., an EXCEL format file, etc.).

SUMMARY

In a first aspect, user-generated input is received that includes a sequence of words associated with initiation of a computer-implemented event. Thereafter, such input is parsed using at least one natural language processing (NLP) model. This parsed input is then used by a machine learning model to determine a suggested template having a plurality of fields for initiating the event. The template can then be presented in a graphical user interface.

Further user-generated input can be received populating at least a portion of the fields. The event can be initiated once all of the fields have been completed. The event can take various forms including a computer-implemented procurement process.

In some cases, a machine learning model can be used to populate at least a portion of the fields. Such machine learning model can be the same or a different one that the model that selected the suggested template.

The graphical user interface can form part of a web browser, a mobile phone application, a dedicated client application, and/or a chatbot interface.

The user-generated input can be received via different modalities including directly into an input box, via a chatbot, via voice instructions (by way of a computing device), and/or via e-mail.

The machine learning model can assign one of a plurality of classes to each word that are used to determine the suggested template.

The machine learning model can take various forms including an extreme gradient boosting model.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, by using natural language processing techniques as described herein, user can create events (e.g., sourcing events, etc.) using any communication medium including, but not limited to, voice, e-mail, and chatbot interfaces. Further, the techniques described herein are also advantageous in that the underlying algorithms are language agnostics provided that they are trained with appropriate samples.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is a view of a graphical user interface illustrating a suggested template;

DETAILED DESCRIPTION

The current subject matter is directed to the use of a combination of natural language processing and machine learning to parse a user input, select an appropriate UI-based template (e.g., a web-based form to create a new sourcing object event as part of a supply chain procurement process, etc.), and at least partially populate such template with values.

While the current subject matter is directed to the creation of a sourcing object (sometimes referred to herein as a sourcing event involved with a computer-implemented procurement process), it will be appreciated that the current subject matter can be applied to the intelligent selection of a user interface template and, additionally in some cases, to the population of some or all of the fields of such template. Once populated, the interface can provide for the user to modify or otherwise alter such populated fields as may be needed/desired.

A user can provide user input comprising a natural language string (i.e., free running text, etc.) via various modalities including e-mail, chatbot, and/or a document (e.g., a spreadsheet document, etc.). Once provided, the user input can be parsed using natural language processing (NLP) as follows. First, various sourcing object headers can be identified including one or more of: title of an event (if the user input is e-mail based, the subject line can be the event title, etc.), type of event (RFP, RFI, auction, etc.), event start and end dates, geographic region and corresponding currency, and an associated commodity (i.e., good, object, etc.). Next, using a machine learning model trained using historical data with known outcomes, a template can be selected and recommended to the user (e.g., by presenting such template in a graphical user interface). The historical data can vary depending on user preferences or otherwise. For example, the historical data can be based on commodity, region, user, process owner, item to be procured, last or previously used templates, etc.

The template, when presented to the user in the graphical user interface, can, in some variations, include a plurality of fields, some of which are prepopulated with data (based on the user input).

The machine learning model can take a variety of forms including, without limitation, an extreme gradient boosting algorithm, a neural network model (including deep learning), a logistic regression model, a support vector machine, a random forest, a nearest neighbor model, a Bayesian model, a genetic algorithm, and/or the like.

Figure 1:
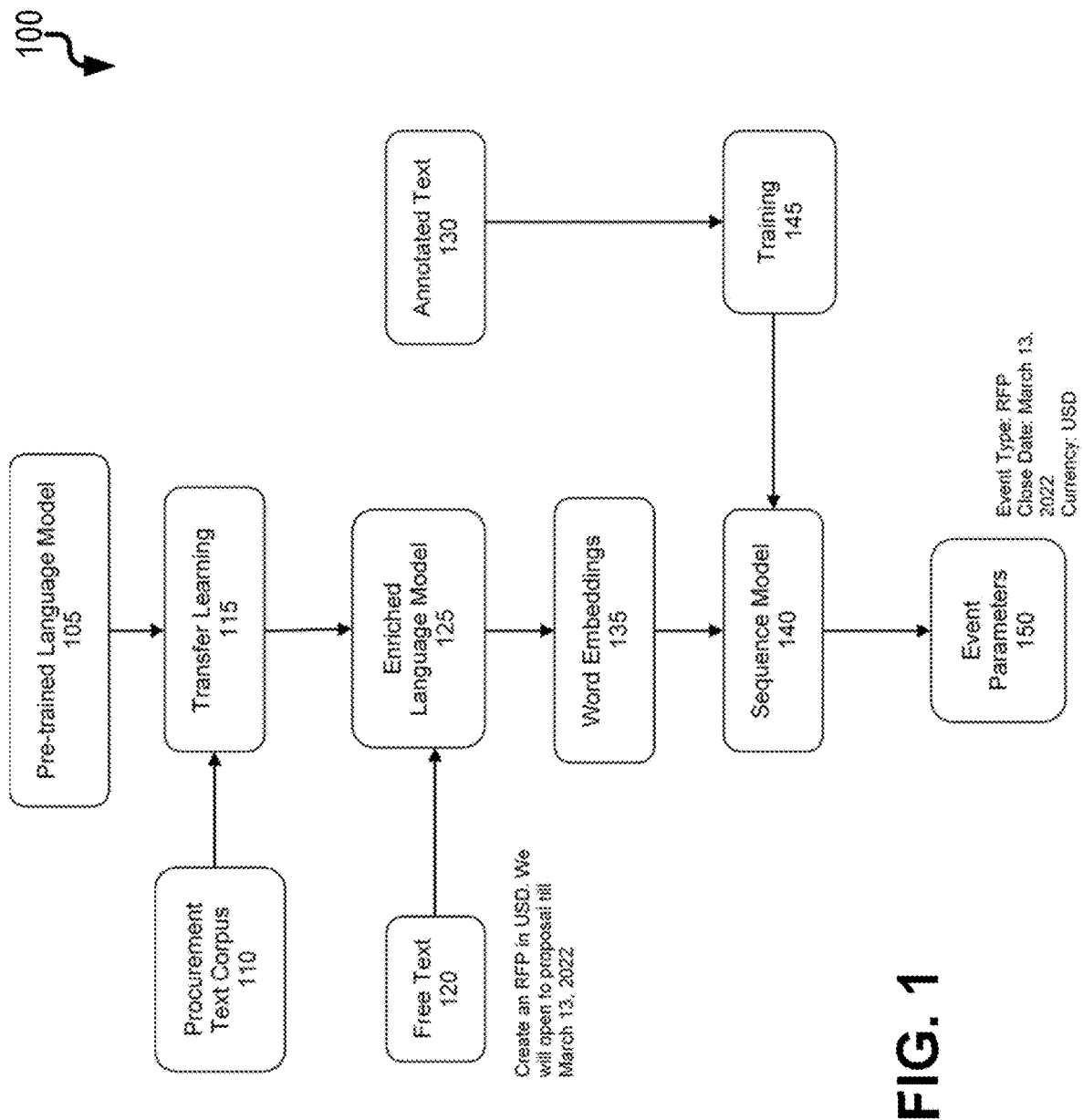
FIG. 1 is a process diagram illustrating creation of event parameters from user-generated input.

With reference to diagram 100 of FIG. 1, a text corpus can be generated 110 in connection with the NLP using text from various sources. For example, online resources (especially those having same or similar text across multiple languages such as WIKIPEDIA) can be accessed. Other textual documents such as product documentation and the like can be used for creating vector representations of the corresponding text.

Next, various information within the vectorized text is identified and tagged to facilitate training. A pre-trained language model 105 (i.e., a model trained using a large corpus of text such as from WIKIPEDIA, blogs, books, and the like that understands semantics and compositional structure of the language of interest, etc.) can be applied to transfer learning 115 in a domain of interest (e.g., procurement) to extract objects of interest (e.g., a sourcing object, etc.) from the vectorized text. Transfer learning 115, in this context, refers to the ability to train a model on one dataset and then adapt that model to perform different NLP functions on a different dataset. In this case, the pre-trained language model 105 was trained on Wikipedia and books and then applied to handle procurement problems. A sequence model 140 can be used to tag each word in the text to one of a plurality of pre-defined classes. An example class set can include, for example, {Unknown, Event Type, Start and Closing Date, Currency, etc}. The sequence model 140 is configured to understand sequences of words to perform task like translation, pronoun understanding etc. As an example, a user enters the following free text: "create an auction which will run from 18$^{th}$ to 20$^{th}$ August". To understand 20$^{th}$ August is the closing date of event, the sequence model 140 needs to understand token arrangement in the sentence.

During a training phase 145, free text is collected from multiple sources from which an event is to be created. Free text 120 is collected from multiple sources from which an event is to created. This collected text is then tokenized and such token are manually annotated 130 to be labeled as relating to a particular class to result in an enriched language model 125. All input words can then be converted to word embeddings 135 (i.e., vectors, etc.) using the pre-trained language model 105. ElmoEmbeddings is one example of such a model. Machine learning algorithms typically work using numbers and the current techniques provides several ways to convert words to numbers. One class of representation is called word embeddings. In this approach, word is represented by set of 100 numbers called vectors. The vectors itself are the output of machine learning algorithm. These vectors are semantically aware i.e. vectors of two close word like King and monarch will be very similar. With general word embeddings, words like "Bank" will have same vector even when used as "Bank of America" versus "River bank". Elmo embeddings addresses such situations by generating different vectors of same word when used in different context.

A sequence model architecture 140 can then be used to map the input words to one of the classes. An example sequence model architecture can utilize one or more neural networks. For example, the architecture can include a BiLSTM layer and softmax at the end. Once the training 145 is completed, weights assigned to each feature are stored so that they can be later used in real-time when processing a user input.

During a real time tagging phase, learned weights can be loaded into the memory with a neural network architecture during service startup phase. The service startup phase can also be referred to as an inference phase during which the trained model is loaded and inference is done real time when the user makes the requests. The inference phase starts when the model is loaded into memory once when server comes online.

When the system receives free text (i.e., user input) from email, chatbot, etc, such text is converted to vectors (i.e., vectorized) using the pre-trained language model 105. The pre-trained language model can be a neural network which is trained using a corpus of text such as using articles on WIKIPEDIA, a newspaper, etc. A feed forward phase (i.e., an online inference phase) can get activated which classifies each input words (i.e., text string) to one of the predefined classes (e.g., event type, closing date, unknown, etc.).

For example if input text is "Create an RFP which runs from 10/4 till 18/4", each of the words will go through the pre-trained langue model 105 (i.e., a neural network model, etc.) and the output can be as follows:

Create=>UNKNOWN
An=>UNKNOWN
RFP=>EVENT_TYPE
Which=>UNKNOWN
Runs=>UNKNOWN
From=>UNKNOWN
10/4=>UNKNOWN
Till=>UNKNOWN
18/4=>CLOSING_DATE After ignoring all unknown words, event parameter extracted from the text is {"EVENT_TYPE":"RFP", "CLOSING_DATE":"18/4"}

As noted in the above example, all words classified as 'Unknown' are ignored and the classified words are considered as event parameters 150. These event parameters 150 are then used by one or more machine learning models (e.g., extreme gradient boosting, etc.) which are trained using historical data to select an optimal template (either as a suggestion requiring the user to accept or simply providing such template in an interface). Stated differently, after the extraction of the event parameters (150), a next task is identify which template to use. This identification is based on another machine learning model trained using historical user selections when, for example, when event type is RFP. This template selection machine learning model can take various forms including an extreme gradient boosting algorithm. Other machine learning models including classification algorithms such as logistic regression, Random Forests and the like can be utilized.

For the sourcing scenario, the historical data used to train the sequence model 140 can include for example, Template used (target column), Category/Commodity, Region, Department, Date on which the template was used, Currency, Baseline spend, and the like. The sequence model 140 can be retrained over pre-defined intervals (e.g., every week, every X events, etc.) to include newly initiated events (i.e., the sequence model 140 can be adaptive in nature based on continued use).

Figure 2:
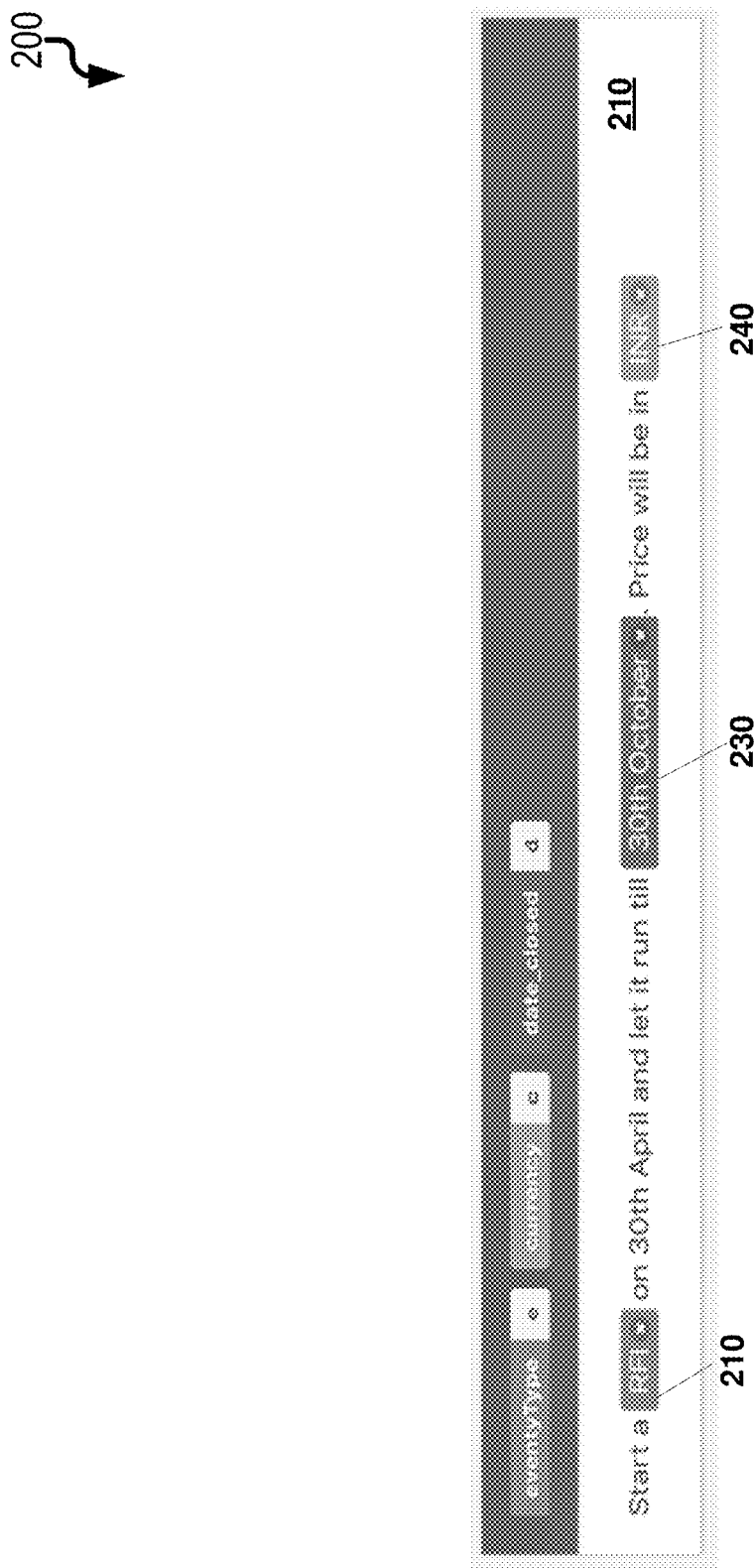
FIG. 2 is an example user-generated input which is parsed into different classes.

FIG. 2 is a sample user-generated input 210 in which certain words are parsed into different classes which form event parameters 150 to be subsequently used by the sequence model 140. For example, RFI 220 is classified as an event type, 30$^{th}$ October 230 is classified as an end date and Indian Rupees 240 being classified as currency.

FIG. 3 is a view 300 of a graphical user interface in which a particular template is being suggested in response to user-generated input (whether entered into a prompt on a web browser, received via a chatbot, received via phone, and/or by e-mail, etc.). In this particular example, the suggested template is a request for information (RFI) template.

The current subject matter can be implemented with an architecture such as that described in co-pending application entitled: "Scalable Architecture for Machine Learning Model Reuse" filed concurrently herewith and assigned U.S. patent application Ser. No. 16/655,886, the contents of which are hereby incorporated by reference.

Figure 4:
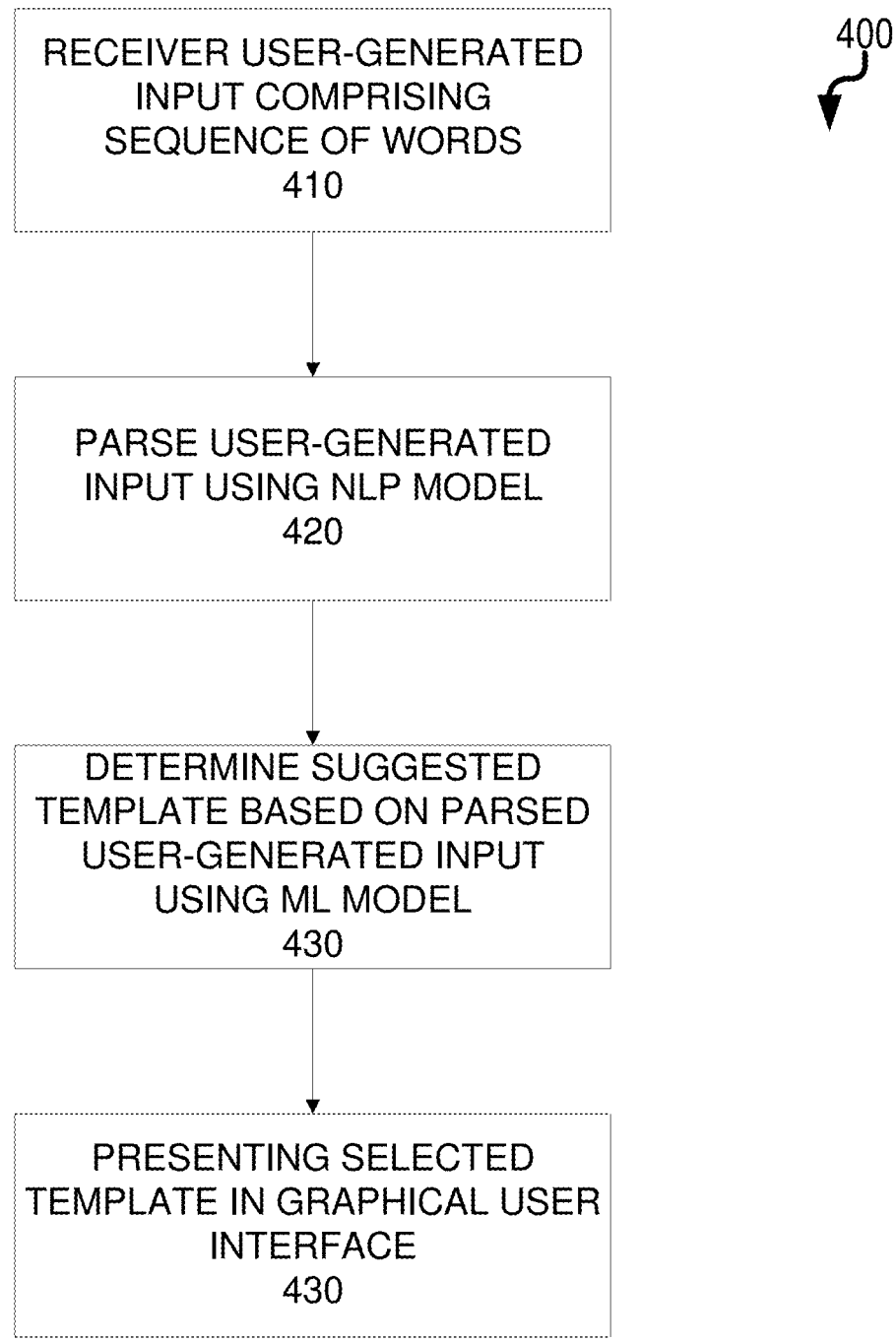
FIG. 4 is a process flow diagram illustrating creation of a sourcing object using a natural language user input.

FIG. 4 is a process flow diagram 400 in which, at 410, user-generated input is received that includes a sequence of words associated with initiation of a computer-implemented event. Thereafter, at 420, the user-generated input is parsed using at least one natural language processing (NLP) model. This parsed user-generated input is then used, at 430, by a machine learning model to determine a suggested template comprising a plurality of fields for initiating the event. The machine learning model can take various forms including, for example, an extreme gradient boosting algorithm, a neural network model (including deep learning), a logistic regression model, a support vector machine, a random forest, a nearest neighbor model, a Bayesian model, a genetic algorithm, and/or the like. Attributes extracted from the parsed user-generated input can be used to specify an event type which, in turn, can be used by the model (along with other extracted attributes from the parsed user-generated input) to identified the suggested template. The suggested template is then presented, at 440, in a graphical user interface.

Figure 5:
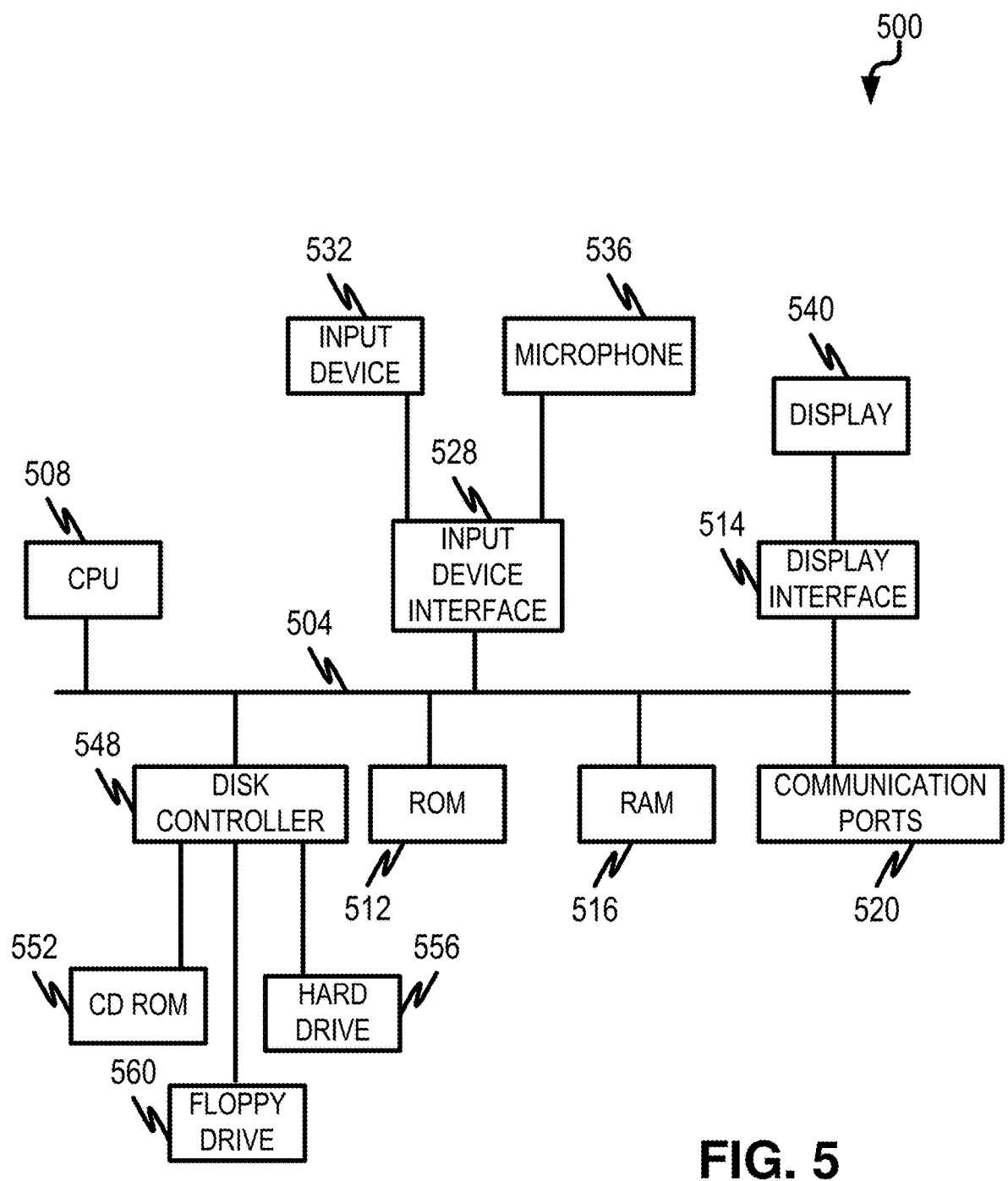
FIG. 5 is a diagram illustrating a computing device for implementing aspects of the current subject matter.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computing devices comprising:
    receiving user-generated input comprising a sequence of words associated with initiation of a computer-implemented event;
    parsing the user-generated input using at least one pre-trained language model that classifies each word to one of a plurality of pre-defined classes, a first of the pre-defined classes being unknown and a second of the pre-defined classes being event type;
    determining, by a machine learning model using the parsed user-generated input, a suggested template comprising a plurality of fields for initiating the event, the machine learning model being different than the pre-trained language model, wherein the words classified as being unknown are ignored by the machine learning model; and
    providing the suggested template for presentation.

2. The method of claim 1 wherein the suggested template is provided for presentation in a graphical user interface, the method further comprising:
    receiving, via the graphical user interface, further user-generated input populating at least a portion of the fields.

3. The method of claim 2 further comprising:
    initiating the event once all of the fields have been completed.

4. The method of claim 3, wherein the event comprises a computer-implemented procurement process.

5. The method of claim 1 further comprising:
    populating at least a portion of the fields based on an output of the machine learning model.

6. The method of claim 1, wherein the suggested template is provided for presentation in a graphical user interface, and wherein the graphical user interface forms part of a web browser.

7. The method of claim 1, wherein the suggested template is provided for presentation in a graphical user interface, and wherein the graphical user interface forms part of a chatbot interface.

8. The method of claim 1, wherein the user input is received via e-mail.

9. The method of claim 1, wherein the machine learning model is an extreme gradient boosting model.

10. The method of claim 1, wherein the machine learning model was trained using historical user selections of events.

11. A system comprising:
    at least one data processor; and
    memory storing instructions which, when executed by the at least one data processor, result in operations comprising:
        receiving user-generated input comprising a sequence of words associated with initiation of a computer-implemented event;
        parsing the user-generated input using at least one pre-trained language model that classifies each word to one of a plurality of pre-defined classes, a first of the pre-defined classes being unknown and a second of the pre-defined classes being event type;
        determining, by a machine learning model using the parsed user-generated input, a suggested template comprising a plurality of fields for initiating the event, the machine learning model being different than the pre-trained language model, wherein the words classified as being unknown are ignored by the machine learning model; and providing the suggested template for presentation.

12. The system of claim 11, wherein the suggested template is provided for presentation in a graphical user interface, and wherein the operations further comprise:

receiving, via the graphical user interface, further user-generated input populating at least a portion of the fields.

13. The system of claim 12, wherein the operations further comprise:

initiating the event once all of the fields have been completed.

14. The system of claim 13, wherein the event comprises a computer-implemented procurement process.

15. The system of claim 11, wherein the operations further comprise:

populating at least a portion of the fields based on an output of the machine learning model.

16. The system of claim 11, wherein the suggested template is provided for presentation in a graphical user interface, and wherein the graphical user interface forms part of a web browser.

17. The system of claim 11, wherein the suggested template is provided for presentation in a graphical user interface, and wherein the graphical user interface forms part of a chatbot interface.

18. The system of claim 11, wherein the user input is received via e-mail.

19. The system of claim 11, wherein the machine learning model was trained using historical user selections of event, and wherein the machine learning model is an extreme gradient boosting model.

20. A non-transitory computer program product storing instructions which, when executed by at least one computing device, result in operations comprising:

receiving user-generated input comprising a sequence of words associated with initiation of a computer-implemented event;

parsing the user-generated input using at least one pre-trained language model that classifies each word to one of a plurality of pre-defined classes, a first of the pre-defined classes being unknown and a second of the pre-defined classes being event type;

determining, by a machine learning model using the parsed user-generated input, a suggested template comprising a plurality of fields for initiating the event, the machine learning model being different than the pre-trained language model, wherein the words classified as being unknown are ignored by the machine learning model; and providing the suggested template for presentation.

\* \* \* \* \*